(12) United States Patent
Zhao (10) Patent No.: US 12,537,936 B2
(45) Date of Patent: Jan. 27, 2026

(54) IMAGE PROCESSING METHOD, NON-TRANSITORY COMPUTER-READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Juanping Zhao, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 207 days.

(21) Appl. No.: 18/476,592

(22) Filed: Sep. 28, 2023

(65) Prior Publication Data
US 2024/0040110 A1    Feb. 1, 2024

Related U.S. Application Data (63) Continuation of application No. PCT/CN2022/078847, filed on Mar. 2, 2022.

(30) Foreign Application Priority Data

Apr. 1, 2021   (CN) .................. 202110358224.X (51) Int. Cl.
*H04N 19/105*   (2014.01)
*H04N 19/162*   (2014.01)
(Continued)

(52) U.S. Cl.
CPC ......... *H04N 19/105* (2014.11); *H04N 19/162* (2014.11); *H04N 19/176* (2014.11); *H04N 19/177* (2014.11); *H04N 19/96* (2014.11)

(58) Field of Classification Search
None
See application file for complete search history.

(56) References Cited

U.S. PATENT DOCUMENTS

| | | | | |
|---|---|---|---|---|
| 2011/0249746 | A1* | 10/2011 | Yang | H04N 19/00 375/240.16 |
| 2013/0287095 | A1* | 10/2013 | Guo | H04N 19/117 375/240.02 |

(Continued)

FOREIGN PATENT DOCUMENTS

| | | |
|---|---|---|
| CN | 101399991 A | 4/2009 |
| CN | 102547272 A | 7/2012 |

(Continued)

OTHER PUBLICATIONS

Chen et al., "Regulated Complexity Scalable MPEG-2 Video Decoding for Media Processors", Aug. 2002, IEEE Transactions on Circuits and Systems for Video Technology, vol. 12, No. 8, pp. 678-687. (Year: 2002).*

(Continued)

*Primary Examiner* — Kaitlin A Retallick
(74) *Attorney, Agent, or Firm* — Ladas & Parry LLP (57) ABSTRACT

An image processing method is provided. The method includes: obtaining a video bitstream; determining an image reference frame according to a structure of a group of pictures (GOP) of the video bitstream; determining a first decoding precision and a second decoding precision according to a power-consumption constraint instruction; and decoding a to-be-decoded block of the image reference frame of the GOP according to the first decoding precision, and decoding a to-be-decoded block of a non-image reference frame of the GOP according to the second decoding precision.

18 Claims, 5 Drawing Sheets

(51) Int. Cl.
*H04N 19/176* (2014.01)
*H04N 19/177* (2014.01)
*H04N 19/96* (2014.01)

(56) References Cited

U.S. PATENT DOCUMENTS

| | | | |
|---|---|---|---|
| 2014/0098887 A1* | 4/2014 | Sermadevi | H04N 19/436 375/240.18 |
| 2014/0177709 A1 | 6/2014 | Hattori | |
| 2017/0208335 A1 | 7/2017 | Ramamurthy et al. | |
| 2017/0324967 A1* | 11/2017 | Yang | H04N 19/423 |
| 2021/0297734 A1* | 9/2021 | Peng | H04N 21/4424 |

FOREIGN PATENT DOCUMENTS

| | | |
|---|---|---|
| CN | 108810549 A | 11/2018 |
| CN | 109640169 A | 4/2019 |
| CN | 111630864 A | 9/2020 |
| CN | 115190304 A | 10/2022 |
| JP | 2008034924 A * | 2/2008 |
| WO | 2019240449 A1 | 12/2019 |

OTHER PUBLICATIONS

Regulated Complexity Scalable MPEG-2 Video Decoding for Media Processors, dated Aug. 1, 2002 (10 pages).

Overview of the High Efficiency Video Coding (HEVC) Standard, dated Jan. 1, 2012 (19 pages).

Video Coding Standards:JPEG and MPEG, dated Jun. 25, 2002 (31 pages).

European Search Report, European Patent Application No. 22778456.8, mailed Jul. 24, 2024 (35 pages).

Chinese First Office Action, Chinese Application No. 202110358224.X, mailed Mar. 18, 2025 (17 pages).

International Search Report and Written Opinion, International Application No. PCT/CN2022/078847, mailed May 6, 2022 (15 pages).

* cited by examiner

IMAGE PROCESSING METHOD, NON-TRANSITORY COMPUTER-READABLE STORAGE MEDIUM, AND ELECTRONIC DEVICE

CROSS-REFERENCE TO RELATED APPLICATIONS

The present application is a continuation of International (PCT) Patent Application No. PCT/CN2022/078847 filed on Mar. 2, 2022, which claims priority to Chinese Patent Application No. 202110358224.X, entitled "IMAGE PROCESSING METHOD, APPARATUS, STORAGE MEDIUM, AND ELECTRONIC DEVICE", filed on Apr. 1, 2021, the contents of all of which are hereby incorporated by reference in its entirety.

TECHNICAL FIELD

The present disclosure relates to the technical field of electronic devices, in particular to an image processing method, a non-transitory computer-readable storage medium, and an electronic device.

BACKGROUND

With the rapid development of science and technology, functions of electronic devices are becoming increasingly powerful. The electronic devices, such as video decoders (VDEC), may decode video images. When decoding a frame of video image, data of multiple frames of decoded video images is typically referenced.

SUMMARY OF THE DISCLOSURE

The present disclosure provides an image processing method, an image processing apparatus, a non-transitory computer-readable storage medium, and an electronic device.

In a first aspect, some embodiments of the present disclosure provide an image processing method, and the image processing method includes the following operations:

obtaining a video bitstream;

determining an image reference frame according to a structure of a group of pictures (GOP) of the video bitstream;

determining a first decoding precision and a second decoding precision according to a power-consumption constraint instruction; and decoding a to-be-decoded block of the image reference frame of the GOP according to the first decoding precision, and decoding a to-be-decoded block of a non-image reference frame of the GOP according to the second decoding precision.

In a second aspect, some embodiments of the present disclosure provide a non-transitory computer-readable storage medium storing a computer program, when the computer program runs on a computer, operations of the above image processing method are executed by the computer.

In a third aspect, some embodiments of the present disclosure provide an electronic device, and the electronic device includes a memory and a processor. Multiple instructions are stored in the memory.

The processor is configured to load the multiple instructions in the memory for executing the following operations:

obtaining a video bitstream;

determining an image reference frame according to a structure of a group of pictures (GOP) of the video bitstream;

determining a first decoding precision and a second decoding precision according to a power-consumption constraint instruction; and decoding a to-be-decoded block of the image reference frame of the GOP according to the first decoding precision, and decoding a to-be-decoded block of a non-image reference frame of the GOP according to the second decoding precision.

BRIEF DESCRIPTION OF THE DRAWINGS

In order to more clearly illustrate the technical solutions in the embodiments of the present disclosure, the accompanying drawings needed to be used in the description of the embodiments will be briefly introduced below. Obviously, the accompanying drawings in the following description are only some embodiments of the present disclosure. For those of ordinary skill in the art, other accompanying drawings may also be obtained according to the accompanying drawings on the premise of without any creative efforts.

DETAILED DESCRIPTION

As illustrated in the figures, the same assembly symbol represents the same assembly, the principle of the present disclosure is taking implementing in a suitable computing environment as an example. The following description is based on the illustrated embodiments of the present disclosure and should not be construed as limiting other embodiments not detailed in the present disclosure.

In the following description, the specific embodiments of the present disclosure will be described by as illustrated in steps, operations, and symbols that are executed by one or more computers, unless otherwise stated. Therefore, these steps and operations will be referred to several times as being executed by the computer. The computer execution in the present disclosure includes the operations performed by computer processing units that represent electronic signals of data in a structured form. These operations convert the data or maintain the data at the location of the memory system in the computer, which may be reconfigured or change the operations of the computer in a way familiar to those of ordinary skill in the art. The data structure maintained by the data is the physical location of the memory, which has specific characteristics defined by the data format. However, the principle of the present disclosure is explained in the above text and does not represent a limitation. Those of ordinary skill in the art may understand that the various steps and operations described below may also be implemented in a hardware.

The terms "first", "second", "third", and the like in present disclosure are configured to distinguish different objects, rather than to describe a specific order. In addition, the terms "include", "comprise", "have" and any variations thereof, are intended to cover a non-exclusive inclusion. In some embodiments, process, method, system, product, or apparatus that includes a series of operations or modules is not limited to the listed operations or modules, some embodiments also include unlisted operations or modules, or some embodiments also include other operations or modules inherent to the process, method, product, or device.

In some embodiments, an image processing method is provided, and the image processing method includes the following operations:
obtaining a video bitstream;
determining an image reference frame according to a structure of a group of pictures (GOP) of the video bitstream;
determining a first decoding precision and a second decoding precision according to a power-consumption constraint instruction; and
decoding a to-be-decoded block of the image reference frame of the GOP according to the first decoding precision, and decoding a to-be-decoded block of a non-image reference frame of the GOP according to the second decoding precision.

In some embodiments, the determining an image reference frame according to a structure of a group of pictures (GOP) of the video bitstream, includes:
obtaining a decoding dependency relationship corresponding to the GOP of the video bitstream; and
in response to a current frame being referenced according to the decoding dependency relationship, determining the current frame as the image reference frame.

In some embodiments, the obtaining a decoding dependency relationship corresponding to the GOP of the video bitstream, includes:
determining the decoding dependency relationship of each image frame according to frame-header information of each image frame of the video bitstream.

In some embodiments, the decoding a to-be-decoded block of the image reference frame of the GOP according to the first decoding precision, and decoding a to-be-decoded block of the non-image reference frame of the GOP according to the second decoding precision, includes:
determining a corresponding tree map according to a preset table of a to-be-decoded block in response to decoding the to-be-decoded block;
determining a transform block of the to-be-decoded block according to the tree map;
zeroing residual coefficients of the transform block of the to-be-decoded block of the image reference frame of the GOP according to the first decoding precision, and inversely-transforming the transform block which has zeroed the residual coefficients thereof;
zeroing residual coefficients of the transform block of the to-be-decoded block of the non-image reference frame of the GOP according to the second decoding precision, and inversely-transforming the transform block which has zeroed the residual coefficients thereof; and
decoding the to-be-decoded block of the inversely-transformed block.

In some embodiments, the zeroing residual coefficients of the transform block of the to-be-decoded block of the image reference frame of the GOP according to the first decoding precision, includes:
obtaining multiple component residuals and corresponding frequencies of the transform block of the to-be-decoded block in the image reference frame; and
sorting multiple component residuals in a sequence from a high frequency to a low frequency to form a first sorting result, and zeroing the residual coefficients of the transform block of the to-be-decoded block in the image reference frame according to the first decoding precision and the first sorting result.

In some embodiments, the zeroing residual coefficients of the transform block of the to-be-decoded block of the non-image reference frame of the GOP according to the second decoding precision, includes:
obtaining multiple component residuals and corresponding frequencies of the transform block of the to-be-decoded block in the non-image reference frame; and
sorting multiple component residuals in a sequence from a high frequency to a low frequency to form a second sorting result, and zeroing the residual coefficients of the transform block of the to-be-decoded block in the non-image reference frame according to the second decoding precision and the second sorting result.

In some embodiments, the decoding the to-be-decoded block of the inversely-transformed block, includes:
obtaining a reference motion vector according to the video bitstream;
obtaining a corresponding reference block from image frames of the video bitstream according to the reference motion vector; and
decoding the to-be-decoded block according to the corresponding reference block.

In some embodiments, the first decoding precision is greater than the second decoding precision.

In some embodiments, before determining the first decoding precision and the second decoding precision according to the power-consumption constraint instruction, the image processing method further includes:
obtaining the current battery level of an electronic device; and
in response to the battery level being less than a preset value, generating the power-consumption constraint instruction according to the battery level.

In some embodiments, the decoding a to-be-decoded block of a non-image reference frame of the GOP according to the second decoding precision, includes:

decoding multiple to-be-decoded blocks of multiple non-image reference frames of the GOP with different second decoding precision, respectively.

In some embodiments, before determining the first decoding precision and the second decoding precision according to the power-consumption constraint instruction, the image processing method further includes:

pre-generating a prompt message to present to a user;

receiving an operation instruction that the user selects whether to confirm according to the prompt information; and generating the power-consumption constraint instruction in response to receiving the operation instruction that the user confirms.

Figure 1:
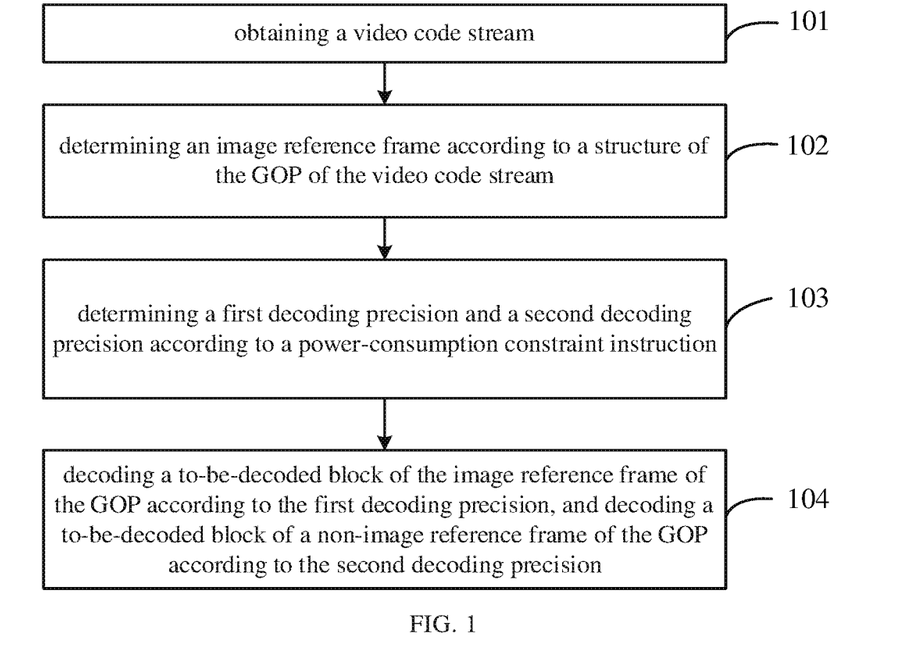
FIG. 1 is a schematic flow chart of an image processing method according to some embodiments of the present disclosure.

As illustrated in FIG. 1, FIG. 1 is a schematic flow chart of an image processing method according to some embodiments of the present disclosure. The image processing method in some embodiments of the present disclosure is performed by an electronic device, and the image processing method includes the following operations.

Operation 101: a video bitstream is obtained.

There are two international organizations that formulate video coding and video decoding technologies. One international organization is ITU Telecommunication Standardization Sector (ITU-T), which formulates standards such as H.261, H.263, H.263+, and so on. The other international organization is International Organization for Standardization (ISO), which formulates standards such as MPEG-1, MPEG-2, MPEG-4, and so on. H.264 is a new digital video coding standard that is jointly formulated by a Joint Video Team (JVT) that is jointly formed by the ITU-T and the ISO. In some embodiments of the present disclosure, when video decoding is performed, the bitstream of the video is first obtained.

Figure 2:
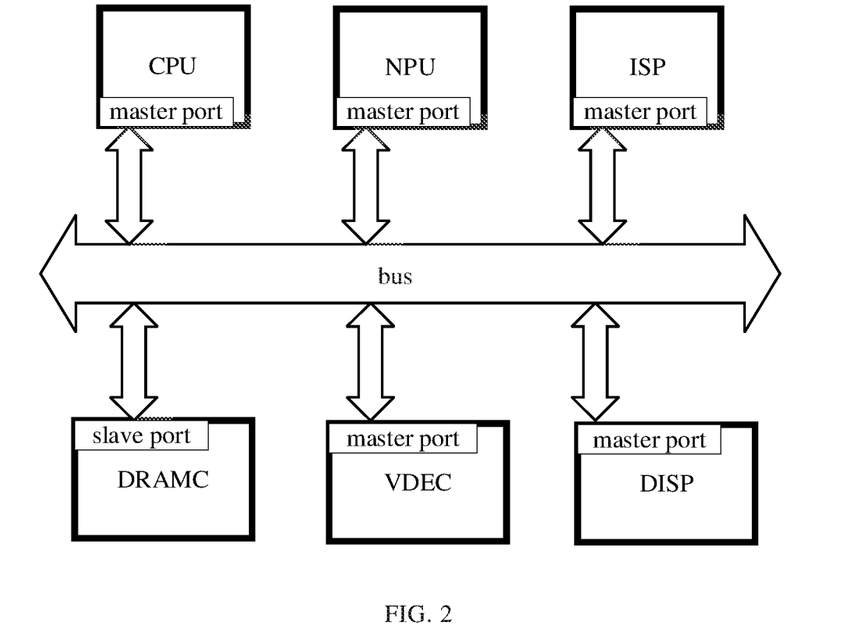
FIG. 2 is a structural schematic view of a video decoding system according to some embodiments of the present disclosure.

As illustrated in FIG. 2, FIG. 2 is a structural schematic view of a video decoding system in the related art. In the video decoding system, a central processing unit/processor (CPU), a neural-network processing unit (NPU), an image signal processing (ISP), a video decoder (VDEC), and a display processing unit (DISP) read data and write data from a dynamic random access memory (DRAM) through a bus and a dynamic random access memory controller (DRAMC). The CPU, the VDEC and the DISP share a bandwidth in a time-sharing manner. The priority of the CPU and the DISP is higher than that of the VDEC. According to specific requirements, the video decoding system may be provided with the DISP or not. The VDEC needs a motion compensation (MC) in response to decoding, which may occupy a large bandwidth.

Figure 3:
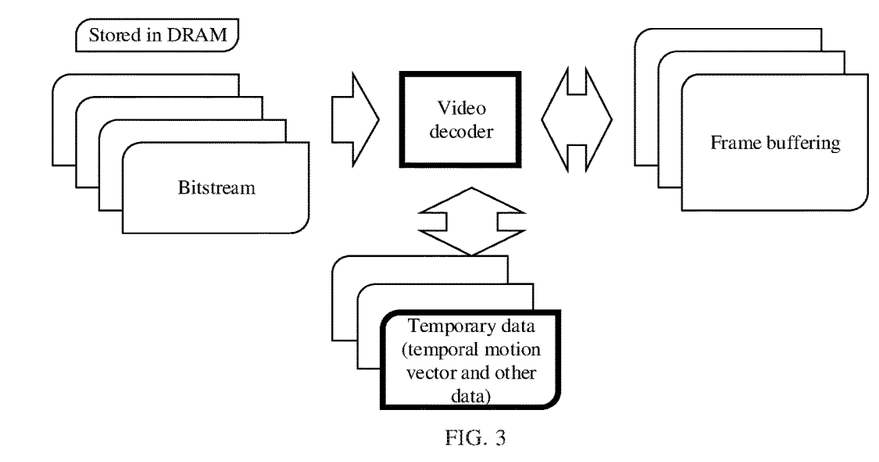
FIG. 3 is a data storage schematic view of a video decoder according to some embodiments of the present disclosure.

The cost of electronic devices such as video decoders is highly valued. During frame buffering, in order to achieve the lowest cost and the highest production yield, the DRAM is usually used as the main storage space. As illustrated in FIG. 3, FIG. 3 is a data storage schematic view of a video decoder in the related art, wherein bitstreams, image frame to be buffered, and temporary data are all stored in the DRAM of the video decoder. However, the DRAM provides a small bandwidth. The temporary data may be a temporal motion vector (TMV) and other data.

The video decoder may employ an internal cache strategy of the video decoder for various video bitstreams. In some embodiments, the video bitstream may be a video bitstream of a standard, and the standard may be a moving picture experts group phase 1 (MPEG-1), a moving picture experts group 2 (MPEG-2), a moving picture experts group 4 (MPEG-4), an essential video coding (MPEG-5/EVC), a low-bit-rate video coding standard H.263 for video conferencing formulated by the ITU-T, an advanced video coding (H.264/AVC), a high efficiency video coding (H.265/HEVC), a versatile video coding (H.266/VVC), a video predictor 8 (VP8), a video predictor 9 (VP9), an alliance for open media video 1 (AV1), and so on.

With the emergence of new video standards, such as H.265/HEVC, H.266/VVC, AV1, MPEG-5, and so on, which aim at larger and larger image sizes and higher and higher frame per second. Based on this, the throughput of data is usually accelerated by increasing the bandwidth of the DRAM or increasing the frequency of the DRAM.

In some embodiments of present disclosure, a current video bitstream is obtained. The video bitstream may include one or more groups of pictures (GOP), and a group of pictures (GOP) includes multiple image frames. In some embodiments of present disclosure, it is explained by taking the current video bitstream including one GOP as an example. The obtained current video bitstream is an encoded video bitstream. The image frames in the current video bitstream may not have been decoded, or some image frames may have been decoded, and other image frames are waiting to be decoded. The decoded image frames may be used as image reference frames in response to other subsequent image frames are decoded.

Operation 102: an image reference frame is determined according to a structure of the GOP of the video bitstream.

In some embodiments of present disclosure, subsequently, the image reference frames and the non-image reference frames of the GOP need to be differently processed according to the power-consumption requirement. Thus, in this operation, it is necessary to determine the reference frames of the GOP according to the structure of the GOP. In some embodiments, the reference frame may be determined through bitstream analysis, so that the bitstream that VDEC actually requires high-precision (high image quality) decoding may be chosen. Based on the selected bitstream paragraphs, it is estimated that at certain times, only sufficient screen precision is required to achieve the required display timeliness conditions. In this way, the energy consumption and power-consumption of VDEC are minimized to cool down the entire system or maintain the energy to be continuously distributed to the most important module.

Specifically, the above image reference frame and the number of times that the reference frame is referenced may be determined by preset parameters. The preset parameters may include a network abstraction layer resolution parameter, a slice header resolution parameter, a reference image list modification parameter, or an image reference frame marking parameter, etc. In some embodiments, the network abstraction layer resolution parameter may be a nal_unit( ) function, the slice header resolution parameter may be a slice_header( ) function, the reference image list modification parameter may be a ref_pic_list_modification( ) function, the image reference frame marking parameter may be a ref_pic_list_modification( ) function.

Taking H.264 as an example, in response to rough frame-level analysis is performed, after analyzing multiple image frames containing NAL unit header information or slice header information, it is possible to distinguish which image reference frames will be referenced multiple times, such as, using a nal_ref_idc variable of a nal_unit( ) function, a num_ref_idx_active_override_flag variable of a slice_header( ) function, a ref_pic_list_modification( ) function, or a dec_ref_pic_marking( ) function to determine the information in advance.

For example, the nal_unit( ) function is configured to analyze the NAL unit beginning with 00 00 00 01 and 00 00

01 from the image frame of H.264, and then directly fill a length of the NAL unit. The nal_ref_idc variable represents the reference level, which represents the situation of being referenced by other image frames. The higher the reference level, the more important the image reference frame is.

The num_ref_idx_active_override_flag variable represents whether the number of actually available image reference frames of the current image frame needs to be overloaded. The syntax elements num_ref_idx_10_active_minus1 and num_ref_idx_11_active_minus1 already present in the image parameter set refer to the number of actual available reference frames in the current image reference frame queue. This pair of syntactic elements may be overloaded in the slice header, to allow a specific image frame to have a greater flexibility. The position of the slice header may be obtained according to the num_ref_idx_active_override_flag variable.

The function of ref_pic_list_modification( ) is a reference image list modification function, and may be stored in a structure of the slice header. The ref_pic_list_modification ( ) function is defined as follows. In response to ref_pic_list_modification_flag_10 is 1, the reference image list RefPicList0 is modified; and in response to ref_pic_list_modification_flag_11 is 1, the reference image list RefPicList1 is modified. The function of dec_ref_pic_marking( ) is used as a identifier of the decoded image reference frame, and a marking operation is configured to move the image reference frame into or out of the image reference frame queue, and specify a symbol of the reference image.

Figure 4:
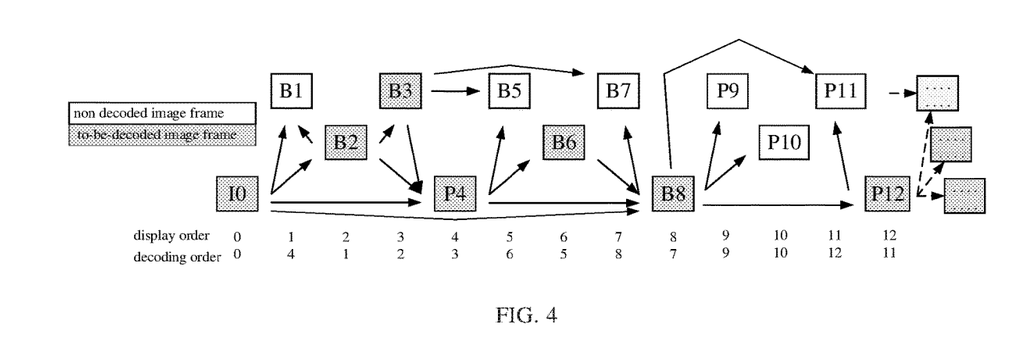
FIG. 4 is a scene schematic view illustrating a reference relationship between each image frame in a group of pictures (GOP) according to some embodiments of the present disclosure.

In some embodiments, as illustrated in FIG. 4, FIG. 4 is a scene schematic view illustrating a reference relationship between each image frame of the GOP according to some embodiments of the present disclosure. FIG. 4 illustrates an example in which one GOP includes 13 image frames. In other embodiments, the number of the image frames of the GOP may be adjusted according to specific requirements. In one GOP, the display order of the image frames may be the same as, or different from the decoding order. As shown in FIG. 4, the display order of the image frames of the GOP is different from the decoding order. In some embodiments, taking the H.264 video bitstream as an example, rough analysis of the H.264 video bitstream is performed. By analyzing header information or slice header information of the NAL unit, it is possible to determine whether certain image frames are referenced and the number of times that the image frames are referenced. By roughly analyze the bitstreams corresponding to the 13 image frames, the reference image list may be obtained. Seen from the arrow direction in FIG. 4, the reference relationship between each image frame and other image frames and the number of times that each image frame is referenced may be obtained. In response to a certain image frame is referenced by other image frames one or more times, the image frame may be used as an image reference frame. In some embodiments, in FIG. 4, a I0 frame is referenced 4 times, a B2 frame whose displaying order is 2 is referenced 4 times, a B3 frame whose displaying order is 3 is referenced 2 times, a P4 frame whose displaying order is 4 is referenced 3 times, a B6 frame whose displaying order is 6 is referenced 1 time, a B8 frame whose displaying order is 8 is referenced 5 times, a P12 frame whose displaying order is 12 is referenced 4 times, and so on. That is, in some embodiments, after bitstream analysis, it is found that the frames need to be accurately decoded are the reference frames I0, B2, B3, P4, B6, B8, P12 configured to needs to play frames. The remaining image frames B1, B5, B7, P9, P10, P11 are non-image reference frames. In FIG. 4, only the rough frame-level analysis is performed by the relevant hardware or software of the video decoder, and the specific reference relationship of each block in the reference frame image cannot be analyzed by the rough analysis mode.

Operation 103: a first decoding precision and a second decoding precision are determined according to a power-consumption constraint instruction.

In some embodiments of the present disclosure, after the decoder completes the code rate analysis, whether or not to reduce the image quality of the decoded image may be determined according to the power-consumption requirement. In response to a processor of the electronic device generates the power-consumption constraint instruction, the first decoding precision and the second decoding precision may be further obtained. The first decoding precision is a precision in response to decoding the image reference frames, the second decoding precision is a precision in response to decoding the non-image reference frames, and the first decoding precision is greater than the second decoding precision.

In some embodiments, as illustrated in FIG. 4, the frames I0, B2, B3, P4, B6, B8, P12 may be used as the reference frames by other frames, therefore a higher first decoding precision may be obtained in response to decoding, such as, using 100% precision as the first decoding precision, however, actually, the first decoding precision is not limited to 100%. The remaining frames B1, B5, B7, P9, P10, and P11 are not be used as the reference frames. Therefore, in order to meet the power-consumption target, the image quality may be sacrificed and a lower second decoding precision may be obtained in response to decoding, such as using 80% precision as the second decoding precision.

The first decoding precision and the second decoding precision may be stored in a memory of the electronic device in advance, and may be directly used in response to receiving the power-consumption constraint instruction. In other embodiments, the first decoding precision and second decoding precision may also be included in the power-consumption constraint instruction. In some embodiments, after receiving the power-consumption constraint instruction, the first decoding precision and the second decoding precision in the power-consumption constraint instruction are further obtained.

In some embodiments, the power-consumption constraint instruction may be automatically generated by the electronic device. In some embodiments, in response to the battery level of the electronic device is less than a preset value, the power-consumption constraint instruction carrying the first decoding precision and the second decoding precision is automatically generated. That is, before receiving the power-consumption constraint instruction, the image processing method further includes the following operations:

obtaining current battery level of the electronic device; and in response to the battery level being less than the preset value, generating the power-consumption constraint instruction according to the battery level.

Further, after determining whether the battery level is less than the preset value, corresponding first decoding precision and corresponding second decoding precision may also be set according to a preset interval corresponding to the battery level, to generate the power-consumption constraint instruction. In some embodiments, the preset value is set to 30%, and three electric quantity intervals of 0-10%, 11%-20% and 21%-30% are set below the preset value. In response to the current battery level of the electronic device is 25%, which is in the electric quantity interval of 21%-30%, the first decoding precision 100% and the second decoding precision 80% corresponding to this interval are obtained, and the power-consumption constraint instruction is generated according to the first decoding precision and the second decoding precision. In response to the current battery level of the electronic device is 18%, which is in the electric quantity interval of 11%-20%, the first decoding precision 100% and the second decoding precision 70% corresponding to this interval are obtained, and the power-consumption constraint instruction is generated according to the first decoding precision and the second decoding precision. In response to the current battery level of the electronic device is 5%, which is in electric quantity interval of 0-10%, the first decoding precision 90% and the second decoding precision 60% corresponding to this interval are obtained, and the power-consumption constraint instruction is generated according to the first decoding precision and the second decoding precision.

Operation 104: a to-be-decoded block of each of the image reference frames of the GOP is decoded according to the first decoding precision, and a to-be-decoded block of each of the non-image reference frames of the GOP is decoded according to the second decoding precision.

For example, in response to receiving the power-consumption constraint instruction, the first decoding precision is 100%, and the second decoding precision is 70%. In the embodiment as shown in FIG. 4, the frames I0, B2, B3, P4, B6, B8, P12 may be decoded with 100% precision, and the frames B1 B5, B7, P9, P10, P11 may be decoded with 70% precision.

Figure 5:
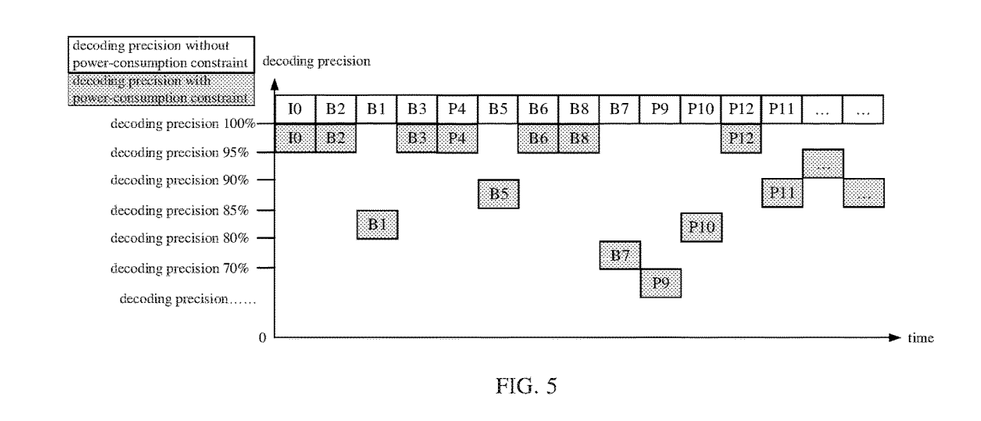
FIG. 5 is a schematic view illustrating the GOP that uses different decoding accuracies with or without a power-consumption constraint according to some embodiments of the present disclosure.

In other embodiments, the non-image reference frames may also use different decoding accuracies. In some embodiments, multiple non-image reference frames are decoded with different second decoding accuracies, respectively. As illustrated in FIG. 5, FIG. 5 is a schematic view illustrating the GOP that uses different decoding accuracies with or without a power-consumption constraint according to some embodiments of the present disclosure. In some embodiments, in response to the power-consumption constraint instruction is not received, that is, the electronic device currently has sufficient electric quantity and does not need to sacrifice decoded image quality to reduce the power-consumption. At this time, in response to decoding the to-be-decoded block, all image frames of the GOP may be decoded with a decoding precision of 100%. In response to receiving the power-consumption constraint instruction, the image reference frame is decoded with the first decoding precision, and multiple non-image reference frames are respectively decoded with corresponding second decoding accuracies.

Therefore, in the image processing method provided in some embodiments of the present disclosure, the current video bitstream is obtained, the image reference frame according to the structure of the GOP of the video bitstream is determined, the power-consumption constraint instruction is received, the first decoding precision and the second decoding precision according to the power-consumption constraint instruction are determined, the to-be-decoded block of the image reference frame of the GOP according to the first decoding precision is decoded, and the to-be-decoded block of the non-image reference frame of the GOP according to the second decoding precision is decoded. In some embodiments of the present disclosure, different decoding accuracies may be set for the image reference frame and the non-image reference frame of the to-be-decoded GOP in response to the power-consumption requiring limiting. The power-consumption of electronic device may be reduced by sacrificing a small amount of video image quality.

Figure 6:
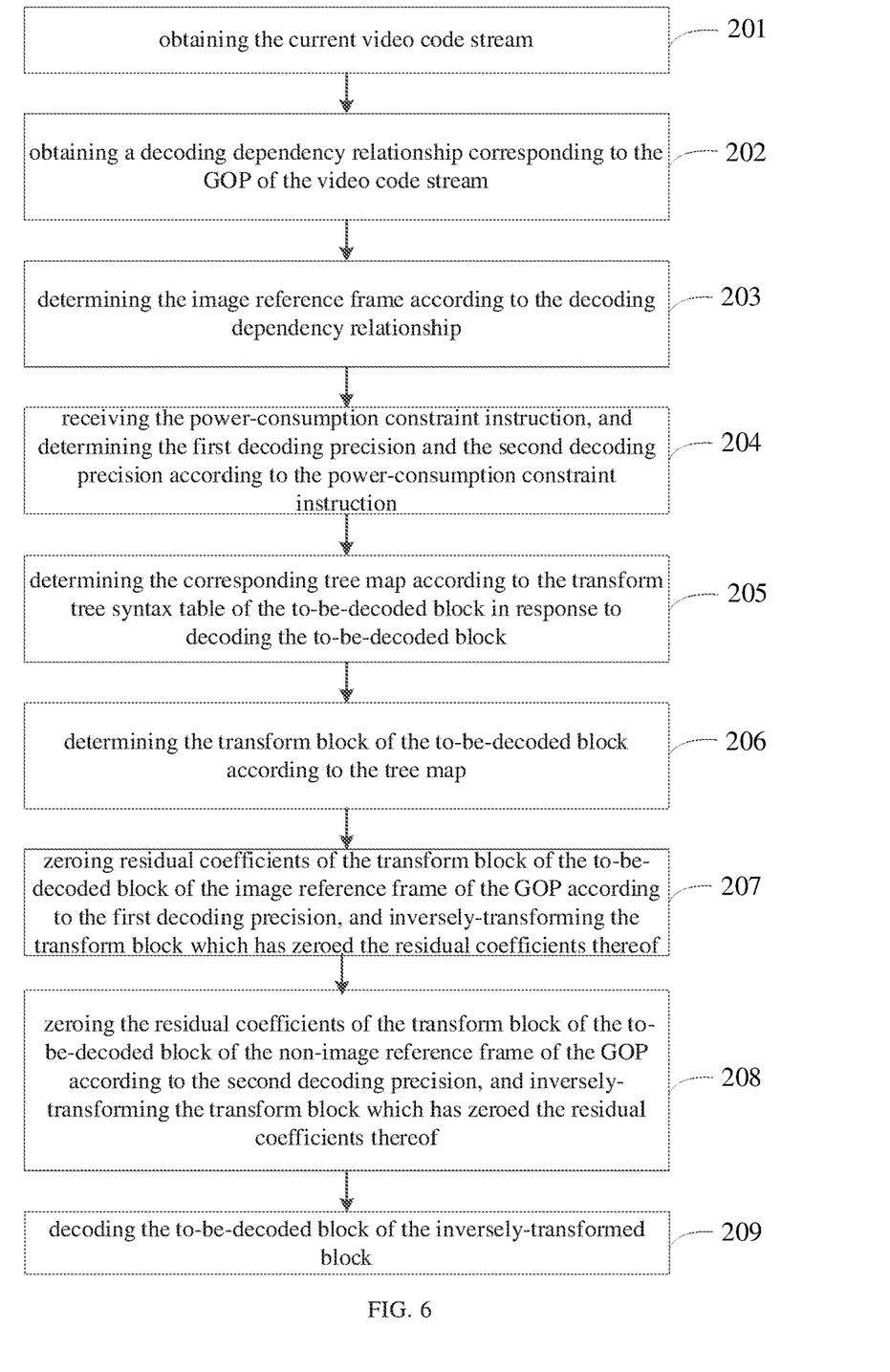
FIG. 6 is a schematic flow chart of an image processing method according to some embodiments of the present disclosure.

The image processing method of the present disclosure will be further introduced on the basis of the method described in the foregoing embodiment. As illustrated in FIG. 6, FIG. 6 is a schematic flow chart of an image processing method according to some embodiments of the present disclosure, and the image processing method includes the following operations.

Operation 201, the current video bitstream is obtained.

In some embodiments of present disclosure, the current video bitstream is obtained. The video bitstream may include one or more groups of pictures (GOP), and a group of pictures (GOP) includes multiple image frames. In some embodiments of present disclosure, it is explained by taking the current video bitstream including one GOP as an example. The obtained current video bitstream is an encoded video bitstream. The image frames in the current video bitstream may not have been decoded, or some image frames may have been decoded, and other image frames are waiting to be decoded. The decoded image frames may be used as image reference frames in response to other subsequent image frames are decoded.

Operation 202: a decoding dependency relationship corresponding to the GOP of the video bitstream may be obtained.

Operation 203: the image reference frame is determined according to the decoding dependency relationship.

The decoding dependency relationship includes reference relationships between each image frame and other image frames. In some embodiments, it is possible to judge whether a current frame is referenced in sequence according to the decoding dependency relationship. In response to the current frame being referenced according to the decoding dependency relationship, the current frame is determined to be the image reference frame; and in response to the current frame being not referenced according to the decoding dependency relationship, the current frame is determined to be the non-image reference frame. That is, the operation of determining the image reference frame according to the decoding dependency relationship, includes the following operations:

in response to the current frame being referenced according to the decoding dependency relationship, determining the current frame to be the image reference frame.

In one embodiment, the VDEC related hardware or software may determine that some image frames will be used in response to other frames are decoded after analysis or pre-estimation, which is the decoding dependency relationship. In some embodiments, according to the frame-header information of each image frame in the current video bitstream, the decoding dependency relationship of each image frame is determined. The data of each image frame may be regarded as a network Abstraction layer (NAL) unit. The frame-header information is configured to identify the beginning of an image frame. The frame-header information may also be regarded as the NAL unit header information. Which is the image frame may be determined through the frame-header information, that is, the image reference frame may be determined.

Operation 204: the power-consumption constraint instruction is received, and the first decoding precision and the second decoding precision are determined according to the power-consumption constraint instruction.

In some embodiments of the present disclosure, after the decoder completes the code rate analysis, whether or not to reduce the image quality of the decoded image may be determined according to the power-consumption requirement. In response to the processor of the electronic device receives the power-consumption constraint instruction, the first decoding precision and the second decoding precision may be further obtained. The first decoding precision is a precision in response to decoding the image reference frames, the second decoding precision is a precision in response to decoding the non-image reference frames, and the first decoding precision is greater than the second decoding precision. In some embodiments, 100% precision is used as the first decoding precision and 80% precision is used as the second decoding precision.

In some embodiments, the electronic device may also automatically generate the power-consumption constraint instruction according to the higher power-consumption caused by long-term video playback needs and predictable behavior. Furthermore, before generating the power-consumption constraint instruction, a prompt message may be generated in advance and present to the user, such as, in the form of a pop-up window or voice. And then an operation instruction that the user selects whether or not to confirm is received, and the power-consumption constraint instruction is generated in response to the user determines to turn on the power-consumption constraint.

Operation 205: in response to decoding the to-be-decoded block, the corresponding tree map is determined according to the preset table of the to-be-decoded block.

During decoding, the bitstream is interpreted. The preset table may be a transform tree syntax table. In some embodiments, the preset table may be obtained from the bitstream, the preset table may interpret the tree map, and the relevant information of a transform block may be quickly calculated through the tree map, such as, the size of the transform block, the specific mode of the inverse transformation of the transform block, etc.

Operation 206: the transform block for the to-be-decoded block is determined according to the tree map.

In some embodiments of the present disclosure, the power-consumption of the electronic device may be reduced by discarding non-zero values. In the process of decoding, the more zero values there are, the less the flipping of the multiplier and adder circuits are. That is, the less non-zero values, the lower the power-consumption and energy consumption of the whole inverse transformation. Therefore, before inverse transformation, the corresponding tree map may be determined according to the preset table of the to-be-decoded block, and then the transform block and the inverse transformation mode may be calculated according to the tree map.

Operation 207: residual coefficients of the transform block of the to-be-decoded block of the image reference frame of the GOP is zeroed according to the first decoding precision, and the transform block with zeroed residual coefficients is inverse transformed.

In actual use, people are not sensitive to high-frequency signals and are more sensitive to low-frequency signals. Thus, in some embodiments of the present disclosure, before inverse transformation, the high-frequency are appropriately discarded starting from high-frequency coefficients, thereby reducing power-consumption due to the increase of zero input during inverse transformation.

In response to the first decoding precision is 100%, the residual coefficients of the transform block of the to-be-decoded block of the image reference frame of the GOP need not be zeroed, because the first decoding precision being 100% indicates that it is no need to reduce power-consumption during decoding the image reference frame at this time. In response to the first decoding precision is less than 100%, the operation of zeroing the residual coefficients of the transform block of the to-be-decoded block of the image reference frame of the GOP according to the first decoding precision is performed.

In some embodiments, the frequencies corresponding to different positions in a word block are also different. In some embodiments, there are five points A, B, C, D, and E in the word block. In these five points, E has the highest frequency component residual, and the frequency decreases sequentially from E, D, C, B, and A. A has the lowest frequency component residual. The high frequency component residual usually has the smallest impact on vision, and E is the least important. Thus, the residual coefficients may be sequentially reduced from the most important A to the least important E. In some embodiments, the residual may be zeroed by using the inverse wavefront method from E to D to C to B to A. Zeroing the residual coefficients against the wavefront direction may gradually decrease the precision of the image. The first decoding precision may determine the degree to which the residual coefficients are zeroed, that is, the degree to which the precision of the image decreases.

Therefore, the operation of zeroing the residual coefficients of the transform block of the to-be-decoded block of the image reference frame of the GOP according to the first decoding precision, includes the following operations:

obtaining multiple component residuals and corresponding frequencies of the transform block of the to-be-decoded block in the image reference frame; and sorting the multiple component residuals in a sequence from a high frequency to a low frequency to form a first sorting result, and zeroing the residual coefficients of the transform block of the to-be-decoded block in the image reference frame according to the first decoding precision and the first sorting result.

Operation 208: the residual coefficients of the transform block of the to-be-decoded block of the non-image reference frame of the GOP according to the second decoding precision are zeroed, and the transform block with zeroed residual coefficients is inverse transformed.

The second decoding precision is smaller than the first second decoding precision, therefore, the second decoding precision must be less than 100%. The operation of zeroing the residual coefficients of the transform block of the to-be-decoded block of the non-image reference frame of the GOP may refer to the operation 207. That is, the operation of zeroing the residual coefficients of the transform block of the to-be-decoded block of the non-image reference frame of the GOP according to the second decoding precision, includes the following operations:

obtaining multiple component residuals and corresponding frequencies of the transform block of the to-be-decoded block in the non-image reference frame; and sorting the multiple component residuals in a sequence from a high frequency to a low frequency to form a second sorting result, and zeroing the residual coefficients of the transform block of the to-be-decoded block in the non-image reference frame according to the second decoding precision and the second sorting result.

Operation 209: the to-be-decoded block in the inverse transformed block is decoded.

In some embodiments, the operation of decoding the to-be-decoded block in the inverse transformed block may include the following operations:

obtaining a reference motion vector according to the current video bitstream;

obtaining a corresponding reference block from the image frame of the current video bitstream according to the reference motion vector; and decoding the to-be-decoded block according to the reference block.

In one embodiment, the current video bitstream is parsed. One or more reference motion vectors may be obtained from the current video bitstream. Each reference motion vector corresponds to the reference block. In response to the to-be-decoded block is decoded, it is necessary to refer to the reference block. The relative displacement between the reference block and the block to be encoded may be used as the reference motion vector. The corresponding reference block may be obtained by referencing the motion vector, fine analysis may be achieved, and the to-be-decoded block is finally decoded according to the image data of the reference block.

In some embodiments, the current video bitstream may be entropy decoded, to obtain one or more motion vector differences (MVD). Then according to one or more motion vector differences and corresponding motion vector predictors, one or more reference motion vectors are obtained. In some embodiments, the current video bitstream is entropy decoded, to obtain one or more motion vector differences, then one or more reference motion vectors are obtained according to the one or more motion vector differences and corresponding motion vector predictors. In some embodiments, the sum of the motion vector difference and the motion vector predictor value is used as the reference motion vector. The corresponding one or more reference blocks are obtained from the one or more image frames of the current video bitstream according to the one or more reference motion vectors, to finally read the image data of the required reference block. The current to-be-decoded block or the sub-block in the current to-be-decoded block is decoded according to the read image data of the reference block.

In response to decoding, the image frame may be divided into multiple blocks that do not overlap each other, and these blocks form a rectangular array. Each block is a block of N×N pixel, such as, a block of 4×4 pixel, a block of 32×32 pixel, a block of 128×128 pixel, and so on. In response to decoding the to-be-decoded block in the current image frame, it is necessary to read the image data of the required image reference frame from the memory.

Figure 7:
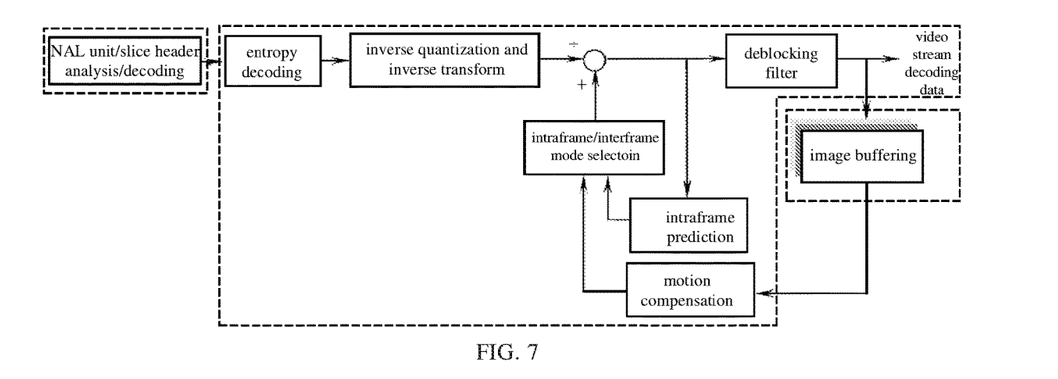
FIG. 7 is a scene schematic view illustrating decoding by a video decoder according to some embodiments of the present disclosure.

In some embodiments, as illustrated in FIG. 7, FIG. 7 is a scene schematic view illustrating decoding by a video decoder according to some embodiments of the present disclosure. The current video bitstream is described by taking a video bitstream of H.264 as an example. After the current video bitstream is entropy decoded, one or more motion vector differences and a quantized first residual are obtained. According to the motion vector differences and the corresponding motion vector predictor values, the reference motion vectors may be obtained, which may accurately determine the reference block that is used for motion compensation. Entropy decoding may be achieved through an independent hardware design or through software. The parsing of the current video bitstream and image buffering may be achieved in a software manner, which may be implemented by driving programs or Open Media Acceleration (Open MAX) framework. After inversely quantizing and inversely transforming the first residual, a second residual may be obtained. According to the reference motion vector (relative displacement between the reference block and the current to-be-decoded block or the sub-block in the current to-be-decoded block) and the reference block, the predicted values of the current to-be-decoded block or the sub-block in the current to-be-decoded block may be obtained. The predicted values of the current to-be-decoded block or the sub-blocks in the current to-be-decoded block may be obtained through Intraframe prediction or motion compensation. The inverse quantization and inverse transformation, Intraframe/interframe mode selection, intraframe prediction, motion compensation, and deblocking filtering during decoding may be achieved through an application specific integrated circuit (ASIC).

After obtaining the predicted values of the current to-be-decoded block or the sub-blocks of the current to-be-decoded block, the second residual is added to the predicted values of the current to-be-decoded block or the sub-block of the current to-be-decoded block, to obtain a decoded block of the current to-be-decoded block or a decoded sub-block (actual value) of the sub-block in the current to-be-decoded block. Filtering is performed by a deblocking filter according to the decoded block of the current to-be-decoded block or the decoded sub-block of the sub-block in the current to-be-decoded block, to obtain smooth video bitstream decoding data.

In response to there are other to-be-decoded blocks or sub-blocks of other to-be-decoded blocks in the current to-be-decoded image frame or the current to-be-decoded slice, the other to-be-decoded blocks or the sub-blocks of other to-be-decoded blocks are decoded. In response to all to-be-decoded blocks or sub-blocks of to-be-decoded blocks in the current to-be-decoded image frame or the current to-be-decoded slice have been decoded, the other image frames or slices are decoded until all to-be-decoded image frames or all to-be-decoded slices are decoded.

In addition, the methods provided by some embodiments of the present disclosure may appropriately reduce the video image quality. In response to the image decoded by the video decoder is zoomed out, it means that the high-frequency signal may be lost. Usually, rebuilding fewer high-frequency signals at this time may have the opportunity to not be detected. The post-filter is configured to filter, such as a deblocking filter (DBF), a sample adaptive offset (SAO), an adaptive loop filter (ALF), and so on. After reducing the image quality (that is, the original image is filtered by a low-pass filter), the effect of filtering through the post-filter is not obvious. That is, reducing the image size may appropriately mask the image quality loss in loop filter. Therefore, the method for reducing the power-consumption and the energy consumption is also suitable to the embodiments of the present disclosure, which may zoom out the video image.

In the image processing method provided in some embodiments of the present disclosure, the current video bitstream is obtained, the decoding dependency relationship corresponding to the GOP of the video bitstream is obtained, the image reference frame according to the decoding dependency relationship is determined, the power-consumption constraint instruction is received, and the first decoding precision and the second decoding precision are determined according to the power-consumption constraint instruction. In response to the to-be-decoded block is decoded, the corresponding tree map is determined according to the preset table of the to-be-decoded block. The transform block for the to-be-decoded block is determined according to the tree map. The residual coefficients of the transform block of the to-be-decoded block of the image reference frame of the GOP are zeroed according to the first decoding precision, and the transform block is inverse transformed after the residual coefficients are zeroed. The residual coefficients of the transform block of the to-be-decoded block of the non-image reference frame of the GOP is zeroed according to the second decoding precision, and the transform block is inverse transformed after the residual coefficients are zeroed, to decode the to-be-decoded block of the inverse transformed block. In some embodiments of the disclosure, different decoding precisions may be set for the image reference frame and the non-image reference frame of the to-be-decoded GOP in response to the power-consumption constraint is needed, and the power-consumption of the electronic device is reduced by sacrificing a small amount of video image quality.

Figure 8:
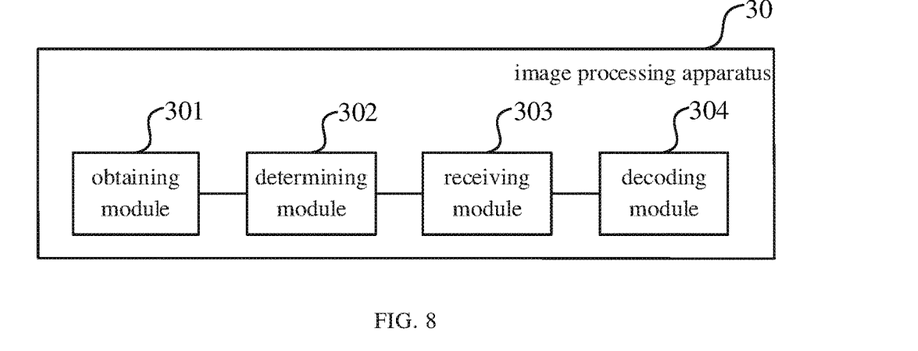
FIG. 8 is a structural schematic view of an image processing apparatus according to some embodiments of the present disclosure.

FIG. 8 is a structural schematic view of an image processing apparatus according to some embodiments of the present disclosure. The image processing apparatus 30 includes an obtaining module 301, a determining module 302, a receiving module 303, and a decoding module 304.

The obtaining module 301 is configured to obtain the video bitstream.

The determining module 302 is configured to determine the image reference frame according to the structure of the GOP of the video bitstream.

The receiving module 303 is configured to generate the power-consumption constraint instruction, and determine the first decoding precision and the second decoding precision according to the power-consumption constraint instruction.

The decoding module 304 is configured to decode the to-be-decoded block of the image reference frame of the GOP according to the first decoding precision, and decode the to-be-decoded block of the non-image reference frame of the GOP according to the second decoding precision.

Figure 9:
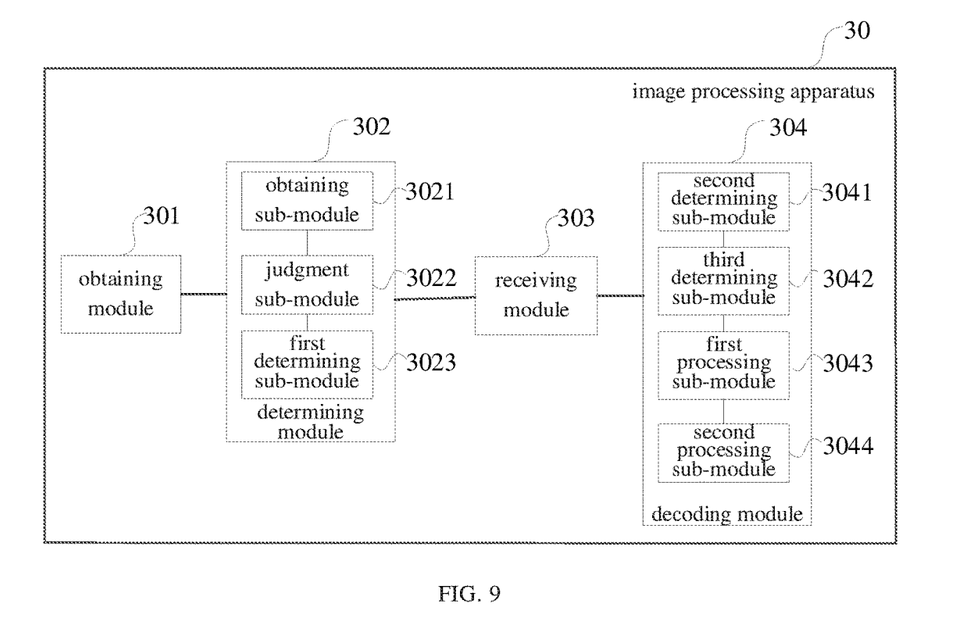
FIG. 9 is a structural schematic view of an image processing apparatus according to some embodiments of the present disclosure.

In one embodiment, as illustrated in FIG. 9, in some embodiments, the determining module 302 may include an obtaining sub-module 3021, a judgment sub-module 3022, and a first determining sub-module 3023.

The obtaining sub-module 3021 is configured to obtain the decoding dependency relationship corresponding to the GOP of the video bitstream.

The judgment sub-module 3022 is configured to judge or determine whether the current frame is referenced according to the decoding dependency relationship.

The first determining sub-module 3023 is configured to determine that the current frame is the image reference frame in response to the determining result of the determining sub-module is yes.

In some embodiments, the obtaining sub-module 3021 may be further configured to determine the decoding dependency relationship of each image frame according to the frame-header information of each image frame of the video bitstream.

In some embodiments, the decoding module 304 may include a second determining sub-module 3041, a third determining sub-module 3042, a first processing sub-module 3043, and a second processing sub-module 3044.

The second determining sub-module 3041 is configured to determine a corresponding tree map according to the preset table of the to-be-decoded block in response to the to-be-decoded block is decoded.

The third determining sub-nodule 3042 is configured to determine the transform block of the to-be-decoded block according to the tree map.

The first processing sub-module 3043 is configured to zero the residual coefficients of the transform block of the to-be-decoded block of the reference frame of the GOP according to the first decoding precision, and inverse transform the transform block with the zero residual coefficients.

The second processing sub-module 3044 is configured to zero the residual coefficients of the transform block of the to-be-decoded block of the non-image reference frame of the GOP according to the second decoding precision, and inverse transform the transform block with the zero residual coefficients.

The decoding module 304 may also be configured to decode the to-be-decoded block in the inverse transformed block.

In some embodiments, the first processing sub-module 3043 may be further configured to: obtain multiple component residuals and corresponding frequencies of the transform block of the to-be-decoded block in the image reference frame; and sort the multiple component residuals in a sequence from a high frequency to a low frequency to form the first sorting result, and zero the residual coefficients of the transform block of the to-be-decoded block in the image reference frame according to the first decoding precision and the first sorting result.

The second processing sub-module 3044 may be further configured to: obtain multiple component residuals and corresponding frequencies of the transform block of the to-be-decoded block in the non-image reference frame; and sort the multiple component residuals in a sequence from a high frequency to a low frequency to form the second sorting result, and zero the residual coefficients of the transform block of the to-be-decoded block in the non-image reference frame according to the second decoding precision and the second sorting result.

In some embodiments, the decoding module 304 may be further configured to: obtain the reference motion vector according to the video bitstream; obtain the corresponding reference block from the image frame of the video bitstream according to the reference motion vector; and decode the to-be-decoded block according to the reference block.

In some embodiments, the first decoding precision is greater than the second decoding precision.

In some embodiments, the receiving module 303 may be further configured to: obtain the current battery level of the electronic device; and generate the power-consumption constraint instruction according to the battery level in response to the battery level being less than the preset value.

In some embodiments, the decoding module 304 may be further configured to: decode the to-be-decoded blocks of the multiple non-image reference frames of the GOP with different second decoding accuracies, respectively.

In some embodiments, the receiving module 303 may be further configured to: pre-generate the prompt message to present to the user; receive the operation instruction that the user selects whether to confirm according to the prompt information; and generate the power-consumption constraint instruction in response to receiving the confirmed operation instruction.

Therefore, the image processing apparatus 30 provided in some embodiments of the present disclosure may obtain the current video bitstream, determine the image reference frame according to the structure of the GOP of the video bitstream, receive the power-consumption constraint instruction, determine the first decoding precision and the second decoding precision according to the power-consumption constraint instruction, decode the to-be-decoded block of the image reference frame of the GOP according to the first decoding precision, and decode the to-be-decoded block of the non-image reference frame of the GOP according to the second decoding precision. In some embodiments of the present disclosure, different decoding accuracies may be set for the image reference frame and the non-image reference frame of the to-be-decoded GOP in response to the power-consumption constraint is needed. The power-consumption of electronic device may be reduced by sacrificing a small amount of video image quality.

In some embodiments of the present disclosure, the image processing apparatus and the image processing method in the above embodiments belong to the same concept. Any operation of the image processing method provided in some embodiments may be run on the image processing apparatus. The specific implementation process thereof is detailed in the image processing method in some embodiments, which is not repeated in present disclosure.

The term "module" may be viewed as a software object executing on a computing system. The various components, modules, engines, and services described in the present disclosure may be viewed as implementation objects on the computing system. The devices and methods described in the present disclosure may be implemented in the software or the hardware, all of which are within the scope of the present disclosure.

The embodiment of the present disclosure also provides a non-transitory computer-readable storage medium storing a computer program. When the computer program is run on a computer, to the computer executes the image processing method.

Some embodiments of the present disclosure further provide an electronic device, such as a tablet computer, a mobile phone or the like. The processor in the electronic device loads instructions corresponding to processes of one or more application programs into the memory according to the following operations, and the processor runs the application programs stored in the memory, thereby implementing various functions as follows:

obtaining the video bitstream;
determining the image reference frame according to the structure of the GOP of the video bitstream;
determining the first decoding precision and the second decoding precision according to the power-consumption constraint instruction; and
decoding the to-be-decoded block of the image reference frame of the GOP according to the first decoding precision, and decoding the to-be-decoded block of the non-image reference frame of the GOP according to the second decoding precision.

The "embodiment" in present disclosure means that specific features, structures, or characteristics described in conjunction with the embodiments may be included in at least one embodiment of the present disclosure. The phrase appearing in various positions in the specification does not necessarily refer to the same embodiment, nor is it an independent or alternative embodiment that is mutually exclusive with other embodiments. Those skilled in the art explicitly and implicitly understand that the embodiments described in present disclosure may be combined with other embodiments.

Figure 10:
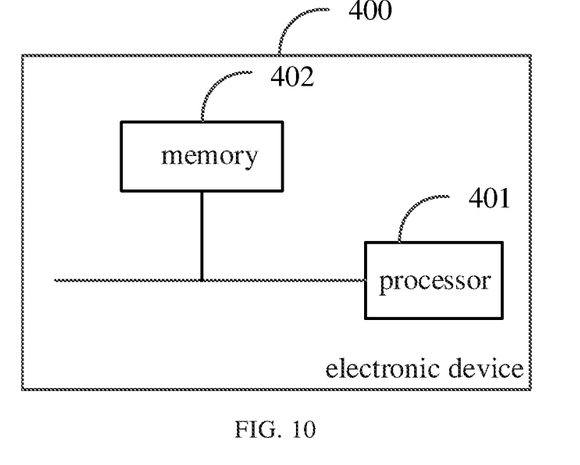
FIG. 10 is a structural schematic view of an electronic device according to some embodiments of the present disclosure.

As illustrated in FIG. 10, the electronic device 400 includes the processor 401 and the memory 402, and the processor 401 is electrically connected to the memory 402.

The processor 401 is a control center of the electronic device 400, configured to connect various parts of whole electronic device 400 with various interfaces and lines, execute various functions of the electronic device 400 and processes data by running or loading computer programs stored in the memory 402, and call data stored in the memory 402, thereby overall monitoring the electronic device 400.

The memory 402 may be configured to store software programs and modules. The processor 401 is configured to execute various functional applications and data processing by running the computer programs and the modules stored in memory 402. The memory 402 may mainly include a stored procedure area and a storage data area. The stored procedure area may be configured to store operation systems, the computer programs (such as sound playing function, image playing function, etc.) that are required by at least one function, etc. The storage data area may be configured to store data that is created based on the use of electronic devices, etc. In addition, the memory 402 may include a high-speed random access memory, and may also include a non-volatile memory, such as at least one disk storage device, flash memory device, or other volatile solid-state storage devices. And correspondingly, the memory 402 may also include a memory controller to provide access to the memory 402 by the processor 401.

In some embodiment of the present disclosure, the processor 401 in the electronic device 400 is configured to load the instructions corresponding to the processes of one or more computer programs into the memory 402, and the processor 401 runs the computer programs stored in the memory 402, thereby implementing various functions. The processor 401 in the electronic device 400 is configured to load the instructions corresponding to the processes of one or more computer programs into the memory 402 according to the following operations:

obtaining the video bitstream;
determining the image reference frame according to the structure of the GOP of the video bitstream;
determining the first decoding precision and the second decoding precision according to the power-consumption constraint instruction; and
decoding the to-be-decoded block of the image reference frame of the GOP according to the first decoding precision, and decoding the to-be-decoded block of the non-image reference frame of the GOP according to the second decoding precision.

In some embodiments, in response to the processor 401 is configured to execute the "determining the image reference frame according to the structure of the GOP of the video bitstream", the processor 401 may be configured to further execute: obtaining the decoding dependency relationship corresponding to the GOP of the video bitstream; and in response to a current frame being referenced according to the decoding dependency relationship, determining the current frame as the image reference frame.

In some embodiments, in response to the processor 401 is configured to execute the "obtaining the decoding dependency relationship corresponding to the GOP of the video bitstream", the processor 401 may be configured to further execute: determining the decoding dependency relationship of each image frame according to the frame-header information of each image frame of the video bitstream.

In some embodiments, in response to the processor 401 is configured to execute the "decoding the to-be-decoded block of the image reference frame of the GOP according to the first decoding precision, and decoding the to-be-decoded block of the non-image reference frame of the GOP according to the second decoding precision", the processor 401 may be configured to further execute: determining the corresponding tree map according to the preset table of the to-be-decoded block in response to decoding the to-bedecoded block; determining the transform block of the to-be-decoded block according to the tree map; zeroing the residual coefficients of the transform block of the to-be-decoded block of the image reference frame of the GOP according to the first decoding precision, and inverse transforming the transform block with the zeroed residual coefficients; zeroing the residual coefficients of the transform block of the to-be-decoded block of the non-image reference frame of the GOP according to the second decoding precision, and inverse transforming the transform block with the zeroed residual coefficients; and decoding the to-be-decoded block in the inverse transformed block.

In some embodiments, in response to the processor 401 is configured to execute the "zeroing the residual coefficients of the transform block of the to-be-decoded block of the image reference frame of the GOP according to the first decoding precision", the processor 401 may be configured to further execute: obtaining multiple component residuals and corresponding frequencies of the transform block of the to-be-decoded block in the image reference frame; and sorting the multiple component residuals in a sequence from a high frequency to a low frequency to form the first sorting result, and zeroing the residual coefficients of the transform block of the to-be-decoded block in the image reference frame according to the first decoding precision and the first sorting result.

In some embodiments, in response to the processor 401 is configured to execute the "zeroing the residual coefficients of the transform block of the to-be-decoded block of the non-image reference frame of the GOP according to the second decoding precision", the processor 401 may be configured to further execute: obtaining multiple component residuals and corresponding frequencies of the transform block of the to-be-decoded block in the non-image reference frame; and sorting the multiple component residuals in a sequence from a high frequency to a low frequency to form the second sorting result, and zeroing the residual coefficients of the transform block of the to-be-decoded block in the non-image reference frame according to the second decoding precision and the second sorting result.

In some embodiments, in response to the processor 401 is configured to execute the "decoding the to-be-decoded block in the inverse transformed block", the processor 401 may be configured to further execute: obtaining the reference motion vector according to the current video bitstream; obtaining the corresponding reference block from the image frame of the current video bitstream according to the reference motion vector; and decoding the to-be-decoded block according to the reference block.

In some embodiments, the first decoding precision is greater than the second decoding precision.

In some embodiments, before the processor 401 is configured to execute generating the power-consumption constraint instruction, the processor 401 may be configured to further execute: obtaining the current battery level of the electronic device; and in response to the battery level being less than the preset value, generating the power-consumption constraint instruction according to the battery level.

In some embodiments, in response to the processor 401 is configured to execute the "decoding of the to-be-decoded block of the non-image reference frame of the GOP according to the second decoding precision", the processor 401 may be configured to further execute: decoding the multiple to-be-decoded blocks of the non-image reference frame of the GOP with different second decoding accuracies, respectively.

In some embodiments, before the processor 401 is configured to execute generating the power-consumption constraint instruction, the processor 401 may be configured to further execute: pre-generating the prompt message to present to the user; receiving the operation instruction that the user selects whether to confirm according to the prompt information; and generating the power-consumption constraint instruction in response to receiving the confirmed operation instruction.

Figure 11:
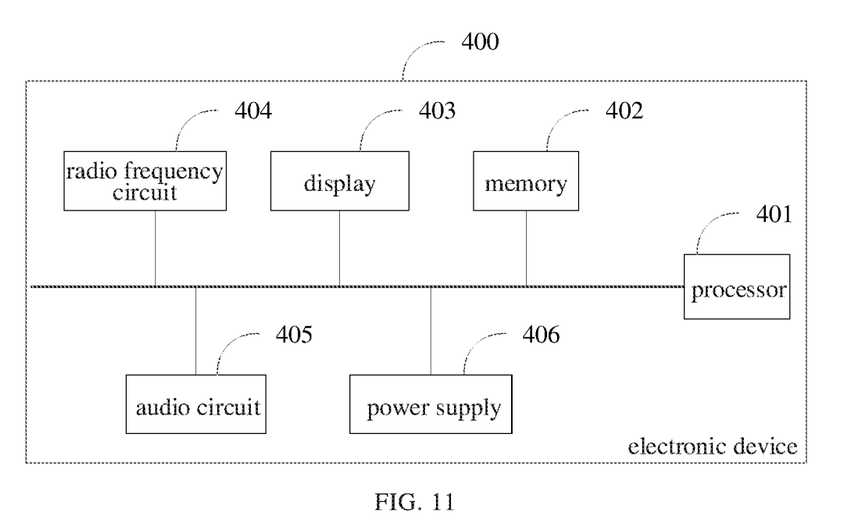
FIG. 11 is a structural schematic view of an electronic device according to some embodiments of the present disclosure.

As illustrated in FIG. 11, in some embodiments, the electronic device 400 may further include a display 403, a radio frequency circuit 404, an audio circuit 405, and a power supply 406. The display 403, the radio frequency circuit 404, the audio circuit 405, and the power supply 406 are electrically connected to the processor 401, respectively.

The display 403 may be configured to display information input by the user or information provided to the user as well as various graphical user interfaces. These graphical user interfaces may include graphics, text, icons, video, or any combination thereof. The display 403 may include a display panel. In some embodiments, the display panel may be a Liquid Crystal Display (LCD), an Organic Light-Emitting Diode (OLED), or the like.

The radio frequency circuit 404 may be configured to transceive radio frequency signals. The radio frequency circuit 404 may establish wireless communication with network devices or other electronic devices, to send and receive signals between the radio frequency circuit 404 and the network devices or other electronic devices. In general, the radio frequency circuit 404 includes, but is not limited to, an antenna, at least one amplifier, a tuner, one or more oscillators, a subscriber identity module (SIM) card, a transceiver, a coupler, a low noise amplifier (LNA), a duplexer, etc.

The audio circuit 405 may be configured to provide an audio interface between the user and the electronic device through a speaker and a microphone. The audio circuit 405 may convert received audio data into electrical signals, transmit the electrical signals to the speaker, and convert the electrical signals into sound signals for output.

The power supply 406 may be configured to power the various components of the electronic device 400. In some embodiments, the power supply 406 may be logically coupled to the processor 401 through a power management system, thereby achieving functions such as charging, discharging, and power-consumption management through the power management system. The power supply 406 may further include one or more DC or AC power supplies, a recharging system, a power failure detection circuit, a power converter or inverter, a power status indicator, or the like.

Although not shown in FIG. 11, the electronic device 400 may further include a camera, a blue-tooth module, etc., which will not be repeated in the present disclosure.

In some embodiments of the present disclosure, the non-transitory computer-readable storage medium may be a magnetic disk, an optical disk, a read only memory (ROM), or a random access memory (RAM).

In the above-mentioned embodiments, the description of each embodiment has its own emphasis, and the part not detailed in some embodiments may be referred to the related description of other embodiments.

For the image processing method of some embodiments of the present disclosure, those of ordinary skill in the art may understand all or part of the processes for implementing the image processing method in the embodiments of the present disclosure may be implemented by controlling related hardware through using the computer program. The computer program may be stored in a non-transitory computer-readable storage medium. In some embodiments, the computer program is stored in the memory of the electronic device and is executed by at least one processor in the electronic device. The execution process may include the operations of the image processing method in some embodiments. The non-transitory computer-readable storage medium may be the magnetic disk, the optical disk, the read-only memory, the random access memory, etc.

For the image processing apparatus of some embodiments of the present disclosure, each functional module may be integrated in a processing chip. The functional module may be physically present separately. Two or more modules may also be integrated in one module. The integrated module may be implemented in a form of hardware, and may also be implemented in the form of a software functional module. When an integrated module is implemented in the form of the software functional module and sold or used as an independent product, it may also be stored on the non-transitory computer-readable storage medium, such as the read-only memory, the disk, or the optical disc.

The image processing method, the image processing apparatus, the non-transitory computer-readable storage medium, and the electronic device provided by some embodiments of the present disclosure are described in detail above. Specific examples are used herein to describe the principles and implementations of the present disclosure. The description of the above embodiments is only for helping to understand the method and core ideas of the present disclosure. Moreover, for those skilled in the art, according to the idea of the present disclosure, the specific implementation mode and the application scope may be changed. In conclusion, the content of the present specification should not be construed as limiting the present disclosure.

What is claimed is:

1. An image processing method, comprising:
    obtaining a video bitstream;
    determining an image reference frame according to a structure of a group of pictures (GOP) of the video bitstream;
    determining a first decoding precision and a second decoding precision according to a power-consumption constraint instruction; and
    decoding a to-be-decoded block of the image reference frame of the GOP according to the first decoding precision, and decoding a to-be-decoded block of a non-image reference frame of the GOP according to the second decoding precision;
    wherein the decoding a to-be-decoded block of the image reference frame of the GOP according to the first decoding precision, and decoding a to-be-decoded block of a non-image reference frame of the GOP according to the second decoding precision, comprises:
        determining a corresponding tree map according to a preset table of the to-be-decoded block in response to decoding the to-be-decoded block;
        determining a transform block of the to-be-decoded block according to the tree map;
        zeroing residual coefficients of the transform block of the to-be-decoded block of the image reference frame of the GOP according to the first decoding precision, and inversely-transforming the transform block which has zeroed the residual coefficients thereof;
        zeroing residual coefficients of the transform block of the to-be-decoded block of the non-image reference frame of the GOP according to the second decoding precision, and inversely-transforming the transform block which has zeroed the residual coefficients thereof; and
        decoding the to-be-decoded block of the inversely-transformed block.

2. The image processing method according to claim 1, wherein the determining an image reference frame according to a structure of a group of pictures (GOP) of the video bitstream, comprises:
    obtaining a decoding dependency relationship corresponding to the GOP of the video bitstream; and
    in response to a current frame being referenced according to the decoding dependency relationship, determining the current frame as the image reference frame.

3. The image processing method according to claim 2, wherein the obtaining a decoding dependency relationship corresponding to the GOP of the video bitstream, comprises:
    determining the decoding dependency relationship of each image frame according to frame-header information of each image frame of the video bitstream.

4. The image processing method according to claim 1, wherein the zeroing residual coefficients of the transform block of the to-be-decoded block of the image reference frame of the GOP according to the first decoding precision, comprises:
    obtaining a plurality of component residuals and corresponding frequencies of the transform block of the to-be-decoded block in the image reference frame; and
    sorting the component residuals in a sequence from a high frequency to a low frequency to form a first sorting result, and zeroing the residual coefficients of the transform block of the to-be-decoded block in the image reference frame according to the first decoding precision and the first sorting result.

5. The image processing method according to claim 1, wherein the zeroing residual coefficients of the transform block of the to-be-decoded block of the non-image reference frame of the GOP according to the second decoding precision, comprises:
    obtaining a plurality of component residuals and corresponding frequencies of the transform block of the to-be-decoded block in the non-image reference frame; and
    sorting the component residuals in a sequence from a high frequency to a low frequency to form a second sorting result, and zeroing the residual coefficients of the transform block of the to-be-decoded block in the non-image reference frame according to the second decoding precision and the second sorting result.

6. The image processing method according to claim 1, wherein the decoding the to-be-decoded block of the inversely-transformed block, comprises:
    obtaining a reference motion vector according to the video bitstream;
    obtaining a corresponding reference block from image frames of the video bitstream according to the reference motion vector; and
    decoding the to-be-decoded block according to the reference block.

7. The image processing method according to claim 1, wherein the first decoding precision is greater than the second decoding precision.

8. The image processing method according to claim 1, wherein before determining the first decoding precision and the second decoding precision according to the power-consumption constraint instruction, the method further comprises:
obtaining current battery level of an electronic device; and
in response to the battery level being less than a preset value, generating the power-consumption constraint instruction according to the battery level.

9. The image processing method according to claim 1, wherein the decoding a to-be-decoded block of a non-image reference frame of the GOP according to the second decoding precision, comprises:
decoding the to-be-decoded blocks of a plurality of non-image reference frames of the GOP with different second decoding precisions, respectively.

10. The image processing method according to claim 1, wherein before determining the first decoding precision and the second decoding precision according to the power-consumption constraint instruction, the method further comprises:
pre-generating a prompt message to present to a user;
receiving an operation instruction that the user selects whether to confirm according to the prompt information; and
generating the power-consumption constraint instruction in response to receiving the operation instruction that the user confirms.

11. A non-transitory computer-readable storage medium storing a computer program, wherein when the computer program runs on a computer, operations in an image processing method are executed by the computer, and the image processing method comprises:
obtaining a video bitstream;
determining an image reference frame according to a structure of a group of pictures (GOP) of the video bitstream;
determining a first decoding precision and a second decoding precision according to a power-consumption constraint instruction; and
decoding a to-be-decoded block of the image reference frame of the GOP according to the first decoding precision, and decoding a to-be-decoded block of a non-image reference frame of the GOP according to the second decoding precision;
wherein the decoding a to-be-decoded block of the image reference frame of the GOP according to the first decoding precision, and decoding a to-be-decoded block of a non-image reference frame of the GOP according to the second decoding precision, comprises:
determining a corresponding tree map according to a preset table of the to-be-decoded block in response to decoding the to-be-decoded block;
determining a transform block of the to-be-decoded block according to the tree map;
zeroing residual coefficients of the transform block of the to-be-decoded block of the image reference frame of the GOP according to the first decoding precision, and inversely-transforming the transform block which has zeroed the residual coefficients thereof;
zeroing residual coefficients of the transform block of the to-be-decoded block of the non-image reference frame of the GOP according to the second decoding precision, and inversely-transforming the transform block which has zeroed the residual coefficients thereof; and
decoding the to-be-decoded block of the inversely-transformed block.

12. An electronic device, comprising:
a memory, wherein a plurality of instructions is stored in the memory; and
a processor, configured to load the plurality of instructions in the memory for executing the following operations:
obtaining a video bitstream;
determining an image reference frame according to a structure of a group of pictures (GOP) of the video bitstream;
determining a first decoding precision and a second decoding precision according to a power-consumption constraint instruction; and
decoding a to-be-decoded block of the image reference frame of the GOP according to the first decoding precision, and decoding a to-be-decoded block of a non-image reference frame of the GOP according to the second decoding precision;
wherein the processor is configured to further execute:
determining a corresponding tree map according to a preset table of the to-be-decoded block in response to decoding the to-be-decoded block;
determining a transform block of the to-be-decoded block according to the tree map;
zeroing residual coefficients of the transform block of the to-be-decoded block of the image reference frame of the GOP according to the first decoding precision, and inversely-transforming the transform block which has zeroed the residual coefficients thereof;
zeroing residual coefficients of the transform block of the to-be-decoded block of the non-image reference frame of the GOP according to the second decoding precision, and inversely-transforming the transform block which has zeroed the residual coefficients thereof; and
decoding the to-be-decoded block of the inversely-transformed block.

13. The electronic device according to claim 12, wherein the processor is configured to further execute:
obtaining a decoding dependency relationship corresponding to the GOP of the video bitstream; and
in response to a current frame being referenced according to the decoding dependency relationship, determining the current frame as the image reference frame.

14. The electronic device according to claim 13, wherein the processor is configured to further execute:
determining the decoding dependency relationship of each image frame according to frame-header information of each image frame of the video bitstream.

15. The electronic device according to claim 12, wherein the processor is configured to further execute:
obtaining a plurality of component residuals and corresponding frequencies of the transform block of the to-be-decoded block in the image reference frame;
sorting the plurality of component residuals in a sequence from a high frequency to a low frequency to form a first sorting result, and zeroing the residual coefficients of the transform block of the to-be-decoded block in the image reference frame according to the first decoding precision and the first sorting result;
obtaining a plurality of component residuals and corresponding frequencies of the transform block of the to-be-decoded block in the non-image reference frame; and
sorting the plurality of component residuals in a sequence from a high frequency to a low frequency to form a second sorting result, and zeroing the residual coefficients of the transform block of the to-be-decoded block in the non-image reference frame according to the second decoding precision and the second sorting result.

16. The electronic device according to claim 12, wherein the processor is configured to further execute:
   obtaining a reference motion vector according to the video bitstream;
   obtaining a corresponding reference block from image frames of the video bitstream according to the reference motion vector; and
   decoding the to-be-decoded block according to the reference block.

17. The electronic device according to claim 12, wherein the processor is configured to further execute:
   obtaining current battery level of an electronic device; and
   in response to the battery level being less than a preset value, generating the power-consumption constraint instruction according to the battery level.

18. The electronic device according to claim 12, wherein the processor is configured to further execute:
   decoding the to-be-decoded blocks of a plurality of non-image reference frames of the GOP with different second decoding precisions, respectively.

* * * * *